(12) United States Patent  
Noguchi

(10) Patent No.: US 9,104,021 B2  
(45) Date of Patent: Aug. 11, 2015

(54) BINOCULARS

(75) Inventor: Kazuhiro Noguchi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 741 days.

(21) Appl. No.: 13/363,463

(22) Filed: Feb. 1, 2012

(65) Prior Publication Data

US 2012/0194904 A1 Aug. 2, 2012

(30) Foreign Application Priority Data

Feb. 1, 2011 (JP) ................................. 2011-020171

(51) Int. Cl.
*G02B 27/64* (2006.01)
*G02B 25/00* (2006.01)

(52) U.S. Cl.
CPC ............ *G02B 25/004* (2013.01); *G02B 27/646* (2013.01)

(58) Field of Classification Search
CPC .......................... G02B 27/646–27/648; H04N 5/2328–5/23287; G03B 2205/0015
USPC .............. 359/407–418, 554–557; 396/52–55; 356/4.04; 348/208.99, 208.1–208.5, 348/208.7–208.11
See application file for complete search history.

(56) References Cited

U.S. PATENT DOCUMENTS

| 5,917,653 | A | 6/1999 | Taniguchi |
| 7,689,109 | B2 | 3/2010 | Noguchi |
| 2010/0053750 | A1* | 3/2010 | Noguchi ........................ 359/480 |
| 2010/0220206 | A1* | 9/2010 | Nagano et al. ............. 348/222.1 |

FOREIGN PATENT DOCUMENTS

| JP | 10-020213 A | 1/1998 |
| JP | 10-301035 A | 11/1998 |
| JP | 2008-185643 A | 8/2008 |
| JP | 2008-233780 A | 10/2008 |

OTHER PUBLICATIONS

Office Action, dated Aug. 12, 2014, issued in corresponding Japanese Patent Application No. 2011-020171.

* cited by examiner

*Primary Examiner* — Stephone B Allen
*Assistant Examiner* — James McGee
(74) *Attorney, Agent, or Firm* — Rossi, Kimms & McDowell LLP

(57) ABSTRACT

The binoculars include right and left optical systems including right and left image stabilizing lenses, a lens holding member holding the image stabilizing lenses and being movable in a plane orthogonal to an optical axis direction, first and second guiding members disposed between the lens holding member and a base member, a first guiding mechanism allowing rolling of a first ball in a first direction between the lens holding member and the first guiding member, a second guiding mechanism allowing rolling of a second ball in a second direction between the first and second guiding members. The binoculars further include a first biasing member applying a biasing force toward the optical axis direction to the first and second guiding members, and a second biasing member applying a biasing force toward a direction orthogonal to the optical axis direction to the second guiding member.

2 Claims, 10 Drawing Sheets

BINOCULARS

BACKGROUND OF THE INVENTION

1. Field of the Invention

The present invention relates to binoculars provided with an image stabilizing function (image blur correcting function) to reduce image blur caused by hand jiggling or the like.

2. Description of the Related Art

Binoculars are often used while being held in observer's hands, so that providing thereto an image stabilizing function to reduce image blur caused by hand jiggling or the like can improve their usability. The image stabilizing function for the binoculars is achieved by moving (shifting) image stabilizing lenses constituting parts of right and left optical systems with an actuator in a direction orthogonal to an optical axis in which the image blur caused by the hand jiggling or the like is canceled out.

The right and left optical systems arranged right and left in the binoculars have a same configuration, and form optical images that are simultaneously observed through observer's right and left eyes. Therefore, it is necessary to shift the image stabilizing lenses simultaneously and equally in the right and left optical systems.

Japanese Patent Laid-Open Nos. 10-020213 and 10-301035 disclose binoculars in which a lens holding member holding both right and left image stabilizing lenses is guided in two directions orthogonal to an optical axis with a guiding configuration in which a guiding pin formed in one of the lens holding member and a base member is inserted into a hole portion formed in the other one thereof.

In the lens holding member guiding configuration in the binoculars disclosed in Japanese Patent Laid-Open Nos. 10-020213 and 10-301035, a gap is provided between the guiding pin and the hole portion to enable smooth shifting of the lens holding member. However, such a gap allows the lens holding member to be displaced in a direction different from the direction to cancel out the image blur.

In particular, rotation of the lens holding member holding the right and left image stabilizing lenses in a plane orthogonal to the optical axis generates errors in a relative positional relationship in the direction orthogonal to the optical axis between the image stabilizing lenses and other lenses in the right and left optical systems. Such errors cause differences in motion and position of the optical images observed through the right and left optical systems, which brings a feeling of strangeness to an observer.

Moreover, sliding between the guiding pin and the hole portion generates a large sliding friction, and the sliding friction acts on the lens holding member as a driving resistance. Therefore, the guiding configurations disclosed in Japanese Patent Laid-Open Nos. 10-020213 and 10-301035 are disadvantageous configurations for minute drive of the lens holding member (that is, of the image stabilizing lenses).

SUMMARY OF THE INVENTION

The present invention provides binoculars capable of preventing rotation of right and left image stabilizing lenses in a plane orthogonal to an optical axis and of reducing a driving resistance of the image stabilizing lenses.

The present invention provides as one aspect thereof binoculars including right and left optical systems respectively including right and left image stabilizing lenses, a lens holding member holding both the right and left image stabilizing lenses and being integrally movable in a plane orthogonal to an optical axis direction of the right and left optical systems, an image stabilizing base member, an actuator moving the lens holding member with respect to the image stabilizing base member in the plane orthogonal to the optical axis direction, a first guiding member and a second guiding member disposed between the lens holding member and the image stabilizing base member, a first guiding mechanism allowing rolling of a first ball in a first direction orthogonal to the optical axis direction between the lens holding member and the first guiding member, and engaging with the first ball in a direction orthogonal to the optical axis and first directions to guide relative movement of the lens holding member and the first guiding member in the first direction, a second guiding mechanism allowing rolling of a second ball in a second direction orthogonal to the optical axis direction different from the first direction between the first guiding member and the second guiding member, and engaging with the second ball in a direction orthogonal to the optical axis and second directions to guide relative movement of the first guiding member and the second guiding member in the second direction, a first biasing member applying a first biasing force toward the optical axis direction to the first and second guiding members, and a second biasing member applying a second biasing force toward a direction orthogonal to the optical axis direction to the second guiding member.

Further features of the present invention will become apparent from the following description of exemplary embodiments (with reference to the attached drawings).

DESCRIPTION OF THE PREFERRED EMBODIMENTS

Exemplary embodiments of the present invention will be described below with reference to the accompanied drawings.

Figure 3:
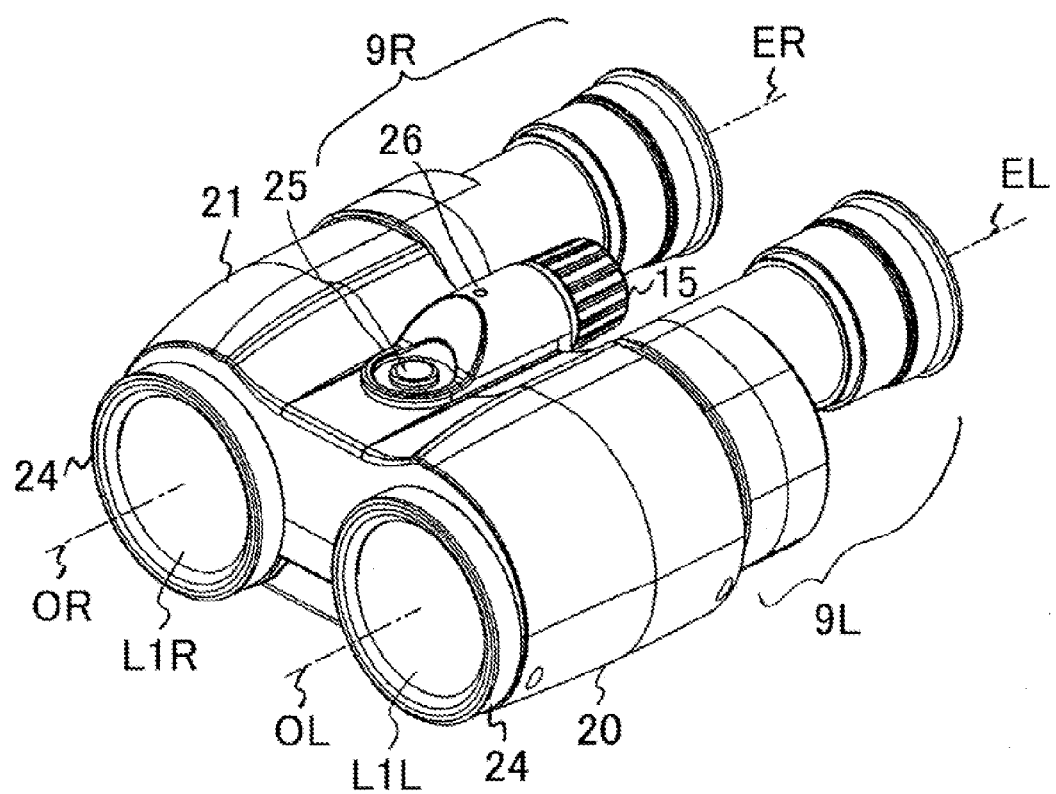
FIG. 3 is an exterior perspective view of the binoculars of the embodiment.
Figure 4:
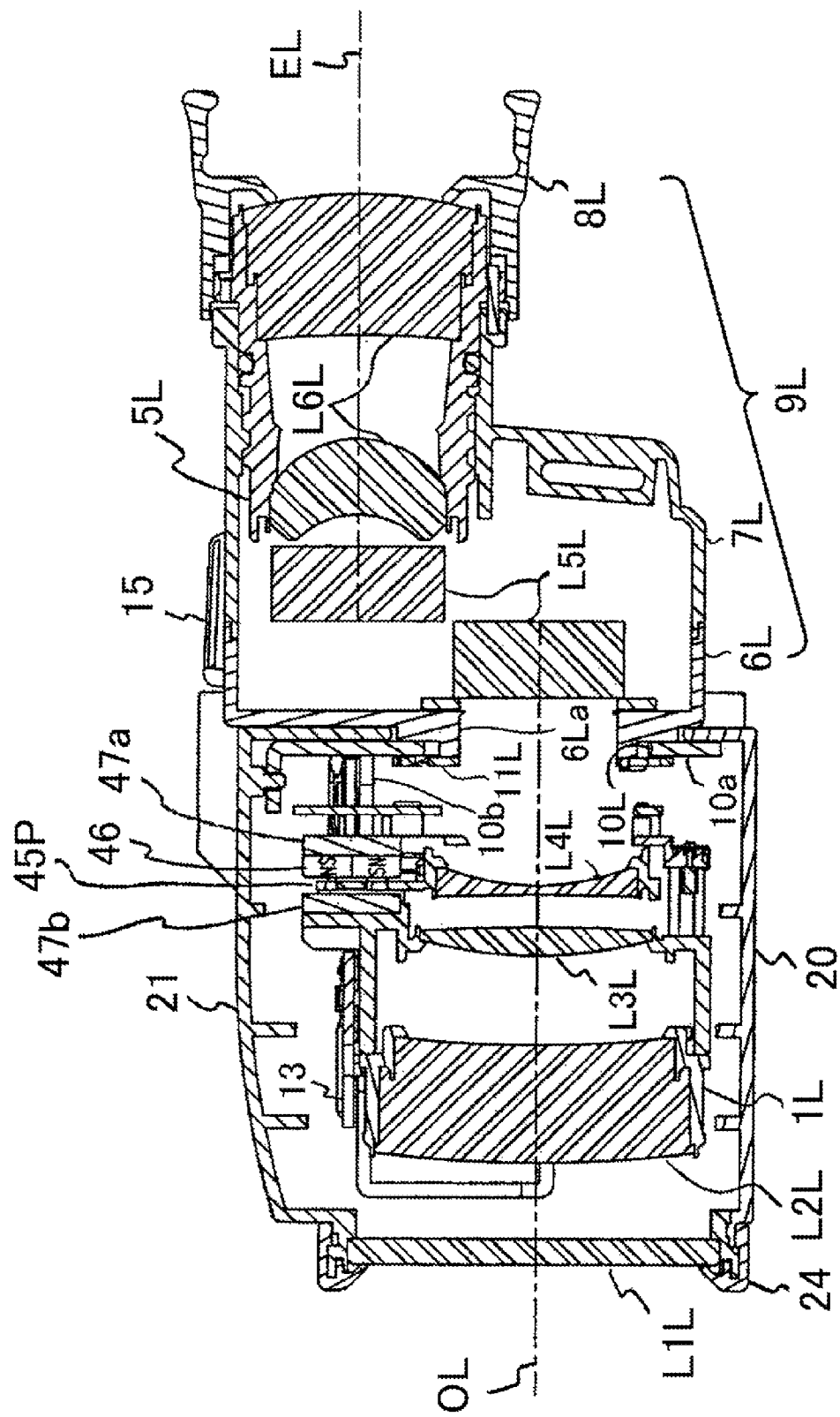
FIG. 4 is a cross-sectional view of the binoculars of the embodiment.
Figure 5:
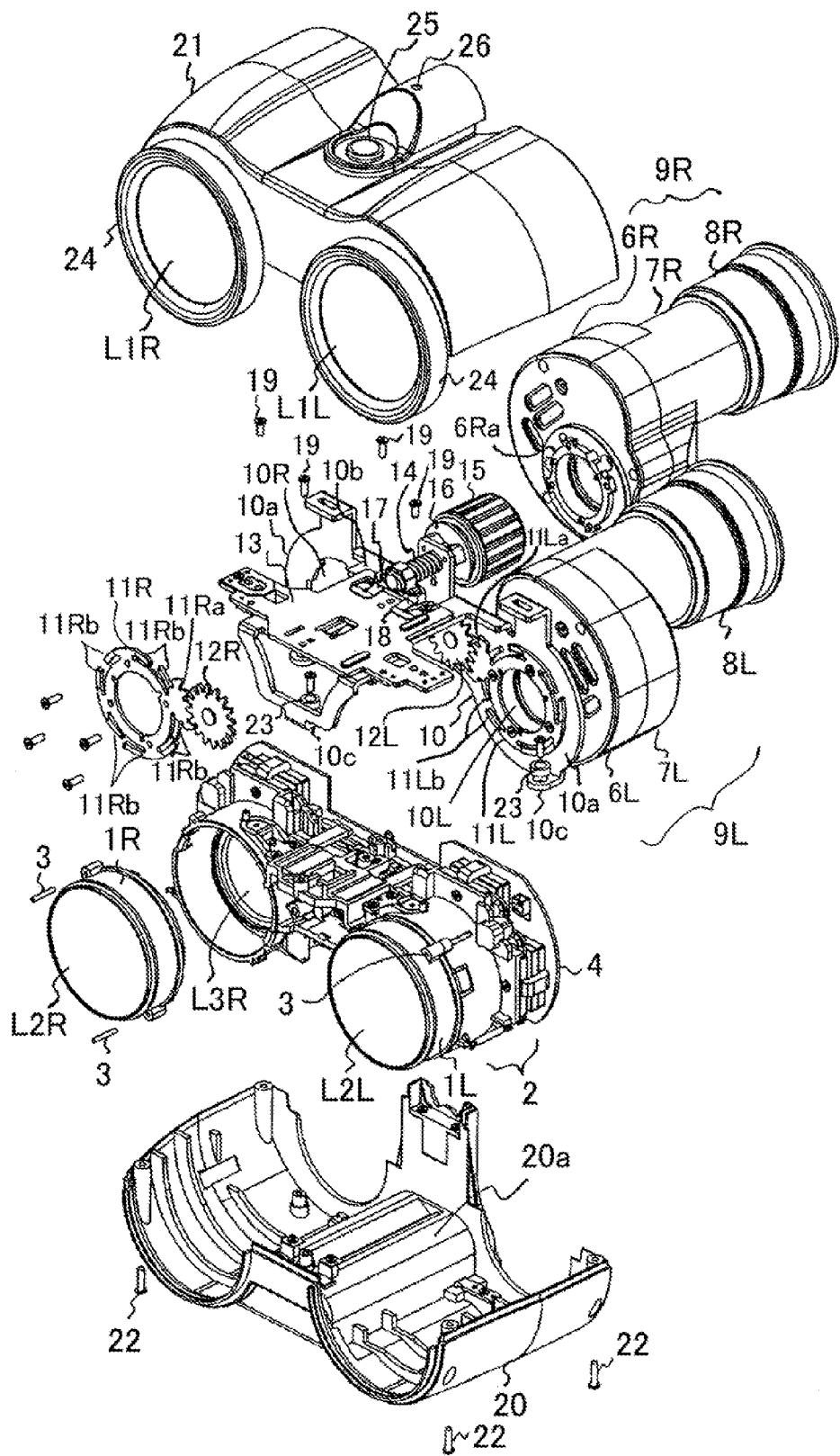
FIG. 5 is an exploded perspective view of the binoculars of the embodiment.

FIGS. 3, 4 and 5 show a configuration of binoculars that is an embodiment of the present invention. FIG. 3 shows an exterior of the binoculars. Reference character OL denotes an optical axis of a left objective optical system, and reference character OR denotes an optical axis of a right objective optical system, the optical axes being indicated by dashed lines. Reference character EL denotes an optical axis of a left ocular optical system, and reference character ER denotes an optical axis of a right ocular optical system. The right and left respectively correspond to a right eye and a left eye of an observer who observes objects through the binoculars.

Moreover, FIG. 3 shows a state where a distance between the optical axes OR and OL of the right and left objective optical systems is equal to that between the optical axes ER and EL of the right and left ocular optical systems. FIG. 4 shows a cross section of the binoculars in the state shown in FIG. 3 cut along a plane including the optical axis OL of the left objective optical system and the optical axis EL of the left ocular optical system. FIG. 5 is an exploded view of the binoculars.

First of all, description will be made of a configuration of the right and left optical systems provided in the binoculars. Reference characters L1R and L1L denote right and left protective glasses. Reference characters L2R and L2L denote right and left front lenses. Reference characters L3R and L3L denote right and left fixed lenses. Reference characters L4R and L4L denote right and left movable lenses as right and left image stabilizing lenses constituting parts (or all) of the right and left objective optical systems. The lenses L2R, L3R and L4R constitute the right objective optical system, and lenses L2L, L3L and L4L constitute the left objective optical system. The right and left objective optical systems are thus configured.

Reference characters L5R and L5L denote right and left polo II type prisms constituting right and left erecting optical systems. Reference characters L6R and L6L denote right and left ocular lenses constituting right and left ocular optical systems. An optical axis of the right ocular lens L6R coincides with the optical axis ER of the right ocular optical system, and an optical axis of the left ocular lens L6L coincides with the optical axis EL of the left ocular optical system. The right and left observation optical systems are thus configured.

Next, description will be made of a mechanical configuration of the binoculars. Reference numerals 1R and 1L denote right and left front lens barrels respectively holding the right and left front lenses L2R and L2L. Reference numeral 2 denotes an image stabilizing unit (image blur correcting unit) including the right and left fixed lenses L3R and L3L and the right and left movable lenses L4R and L4L. A detailed configuration of the image stabilizing unit 2 will be described later.

The right and left front lens barrels 1R and 1L are respectively bayonet-coupled to right and left front end portions of the image stabilizing unit 2 to be positioned in a direction of the optical axis (hereinafter referred to as "an optical axis direction"). Reference numeral 3 denotes positioning pins; two positioning pins 3 provided on each of right and left sides positions each of the right and left front lens barrels 1R and 1L such that the optical axes of the right and left front lenses L2R and L2L coincide with the optical axes of the right and left fixed lenses L3R and L3L in the image stabilizing unit 2.

FIG. 5 shows a state where the left front lens barrel 1L is coupled with the image stabilizing unit 2 and the right front lens barrel 1R is not coupled therewith. Of the two positioning pins 3 provided on each of right and left sides, one is inserted into and penetrates a reference hole portion formed in each of the right and left front lens barrels 1R and 1L and in the image stabilizing unit 2, and the other one is inserted into a hole portion formed in each of the right and left front lens barrels 1R and 1L and a groove portion formed in the image stabilizing unit 2.

Reference numeral 4 denotes an electric substrate to control the image stabilizing unit 2, which is integrally fixed to the image stabilizing unit 2.

Reference numeral 5L denotes a left ocular lens barrel holding the left ocular lens L6L. A right ocular lens barrel holding the right ocular lens L6R is similarly provided though not shown in the figure. Reference numerals 6R and 6L denote right and left prism holders holding the right and left polo II type prisms L5R and L5L. Reference numeral 7L denotes a left ocular holder holding the left ocular lens barrel 5L, and reference numeral 7R denotes a right ocular holder holding the right ocular lens barrel (not shown).

The right and left prism holders 6R and 6L and the right and left ocular holders 7R and 7L are respectively integrated with each other with screws or the like such that the right and left polo II type prisms L5R and L5L and the right and left ocular lenses L6R and L6L may respectively have a predetermined positional relationship.

Reference numerals 8R and 8L denote right and left eyepiece rubbers respectively fixed to the right ocular lens barrel (not shown) and the left ocular lens barrel 5L. A male helicoid screw is formed in an outer circumferential wall of each ocular lens barrel and a female helicoid screw is formed in an inner circumferential wall of each ocular holder, which are engaged with each other. Rotating any one of the ocular lens barrels to move it in the optical axis direction enables right and left diopter adjustments. Right and left ocular unit 9R and 9L are thus configured.

Reference numeral 10 denotes a base member supporting the right and left ocular units 9R and 9L rotatably about the optical axes OR and OL of the objective optical systems and constituting a supporting portion supporting a configuration for focus adjustment according to an observation distance which is performed by moving the entire right and left objective optical systems in the optical axis direction. Since the base member 10 requires high rigidity and high shape accuracy, the base member 10 is formed of a metal plate with a certain degree of thickness.

Of the base member 10, a vertical portion 10a extending vertically to the optical axes OR and OL of the objective optical systems is formed with opening portions 10R and 10L whose central axes coincide with the optical axes OR and OL. Cylindrical portions 6Ra and 6La respectively formed in the right and left prism holders 6R and 6L are inserted and rotatably fitted into the opening portions 10R and 10L.

Reference numerals 11R and 11L denote right and left interlocking plates interlocking the rotation of the cylindrical portion 6Ra of the right prism holder 6R with the rotation of the cylindrical portion 6La of the left prism holder 6L. The right and left interlocking plates 11R and 11L are provided with plural arms 11Rb and 11Lb placed at a predetermined position to generate biasing forces acting in the optical axis direction. The interlocking plates 11R and 11L are respectively coupled to the prism holders 6R and 6L with screws while sandwiching the vertical portion 10a of the base member 10 with the prism holders 6R and 6L. The interlocking plates 11R and 11L are respectively formed with right and left gear portions 11Ra and 11La.

Reference numerals 12R and 12L denote right and left idler gears whose rotation shafts are fixed to the vertical portion 10a of the base member 10 by swaging or the like such that the right and left idler gears 12R and 12L engage with the right and left gear portions 11Ra and 11La. The engagement of the gear portions 11Ra and 11La and the idler gears 12R and 12L enables interlocking rotation of the ocular units 9R and 9L.

FIG. 5 shows a state where the left ocular unit 9L, the left interlocking plate 11L and the left idler gear 12L are attached to the vertical portion 10a of the base member 10, and shows a state where the right ocular unit 9R, the right interlocking plate 11R and the right idler gear 12R are not attached thereto.

The optical axes ER and EL of the right and left ocular optical systems in the right and left ocular units 9R and 9L are decentered by the polo II type prisms L5L and L5R by a predetermined amount with respect to the optical axes OR and OL of the right and left objective optical systems. Therefore, rotation of the ocular units 9R and 9L changes the distance between the optical axes ER and EL of the right and left ocular optical systems, which enables so-called interpupillary adjustment to match the distance between the optical axes ER and EL of the right and left ocular optical systems with a distance between right and left pupils of the observer using the binoculars.

Reference numeral 10b denotes a flat portion of the base member 10, the flat portion 10b being parallel to both the optical axes OR and OL of the right and left objective optical systems. The flat portion 10b serves as the above-mentioned supporting portion supporting the configuration for the focus adjustment according to the observation distance which is performed by moving the entire right and left objective optical systems in the optical axis direction.

Reference numeral 13 denotes a focus supporting member to which the right and left objective optical systems are fixed. The focus supporting member 13 is supported and guided by a guiding mechanism movably in the optical axis direction with respect to the flat portion 10b of the base member 10.

Reference numeral 14 denotes a lead screw. Reference numeral 15 denotes an operation dial coupled to a rear end of the lead screw 14. Reference numeral 16 denotes a bearing supporting the operation dial 15, which is coupled with the lead screw 14, rotatably at a fixed position. The bearing 16 is fixed to the vertical portion 10a of the base member 10 with screws.

Reference numeral 17 denotes a rack engaging with the lead screw 14. Reference numeral 18 denotes a rack spring pressing the rack 17 against the lead screw 14 to maintain the engagement thereof. The rack 17 and the rack spring 18 are integrated with each other with a screw, and the rack spring 18 is fixed to the focus supporting member 13 with a screw. Rotating the operation dial 15 enables movement of the focus supporting member 13 in the optical axis direction.

The image stabilizing unit 2 whose right and left front end portions are coupled with the right and left front lens barrels 1R and 1L forming parts of the right and left objective optical systems is integrally fixed to the focus supporting member 13 with four objective lens barrel fixing screws 19. Thus, the movement of the entire right and left objective optical systems with the movement of the focus supporting member 13 in the optical axis direction enables the focus adjustment according to the observation distance.

Reference numeral 20 denotes a lower cover, and reference numeral 21 denotes an upper cover. The lower and upper covers 20 and 21 are integrated with each other with four cover fixing screws (one of them is not shown in the FIG. 22, and house therein the above-mentioned right and left optical systems and the mechanisms to protect them.

The lower cover 20 is provided with a battery room 20a in which a battery supplying electric power to the electric substrate 4 that controls drive of the image stabilizing unit 2 is housed. The base member 10 is fixed with screws, at three portions (one of them is not shown in the FIG. 10c thereof, to a predetermined position of the lower cover 20 with cushion rubbers 23 placed therebetween.

The upper cover 21 holds the right and left protective glasses L1R and L1L. Reference numeral 24 denotes protective rubbers that cover outer portions of the protective glasses L1R and L1L to absorb impact caused by dropping or the like of the binoculars and applied to the optical systems and the mechanisms inside the covers 20 and 21.

Reference numeral 25 denotes an operation switch operated by the user to switch on and off of the drive of the image stabilizing unit 2. Reference numeral 26 denotes an LED displaying that the operation switch 25 is turned on. The entire binoculars are thus configured.

Figure 1:
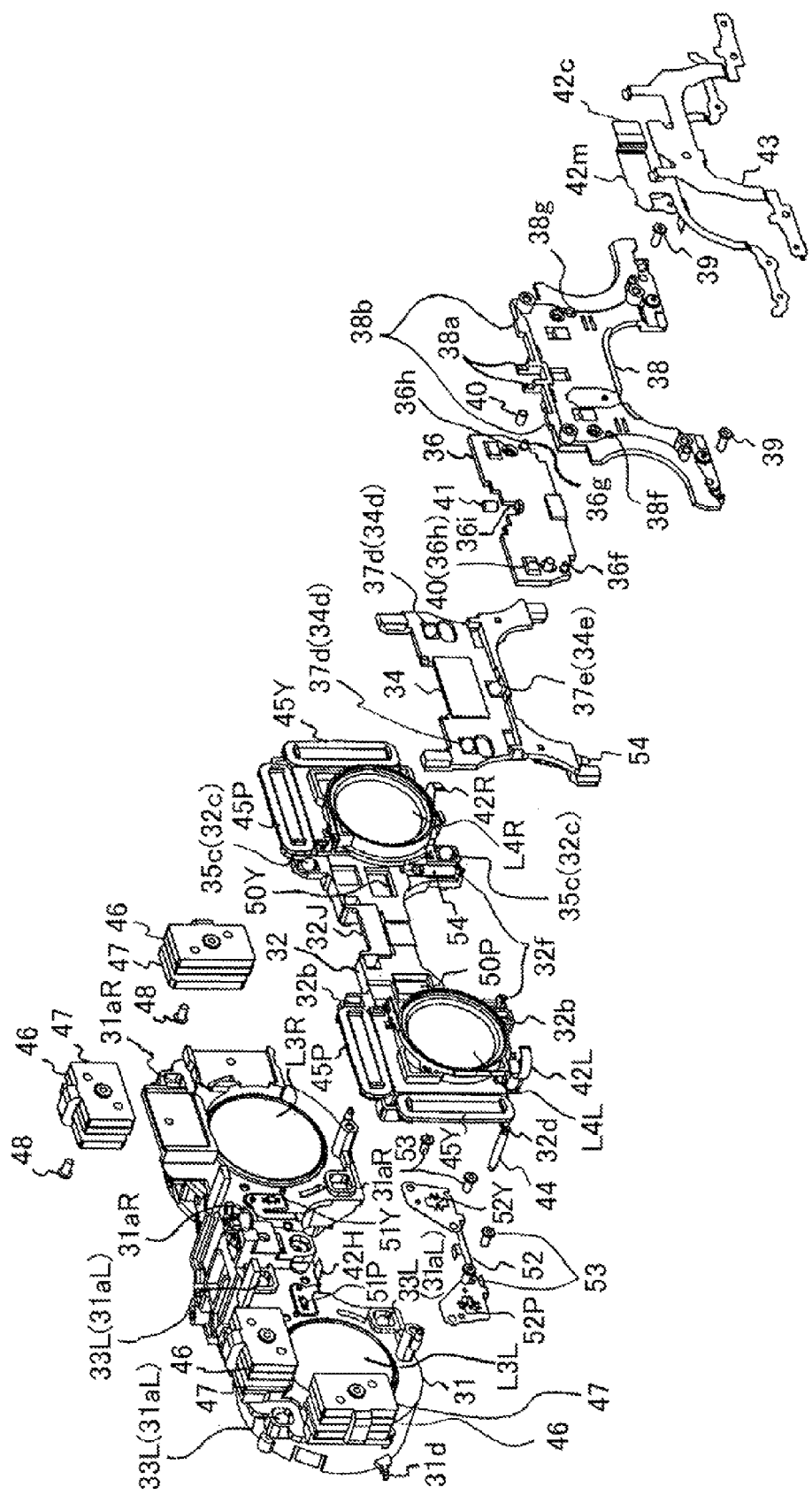
FIG. 1 is an exploded perspective rear view of an image stabilizing unit for binoculars that is an embodiment of the present invention.
Figure 2:
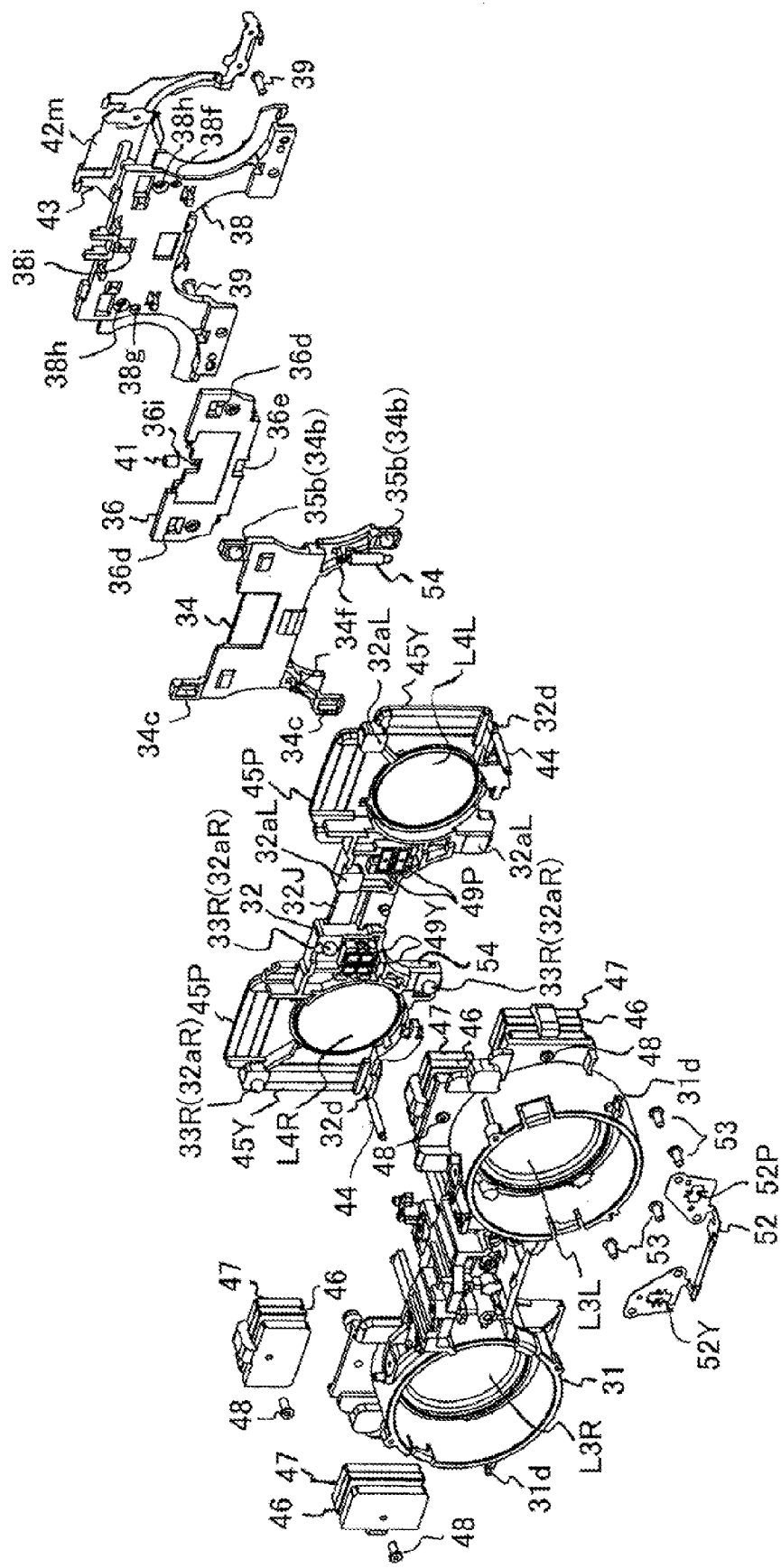
FIG. 2 is an exploded perspective front view of the image stabilizing unit in the embodiment.

Next, description will be made of the image stabilizing unit 2 with reference to FIGS. 1 and 2. First of all, directions in the following description will be defined. A direction connecting the optical axes OR and OL of the right and left objective optical systems in a plane orthogonal to the optical axes OR and OL is defined as a horizontal direction (second direction). A direction orthogonal to the horizontal direction in the same plane is defined as a vertical direction (first direction). In the optical axis direction, a side on which the ocular optical system is provided is defined as a rear side, and an opposite side thereto is defined as a front side. Moreover, a side on which the operation dial 15 is provided in FIG. 4 is defined as an upper side. A position at which a plane including the optical axes OR and OL of the right and left objective optical systems is parallel to a ground surface as shown in FIG. 4 is referred to as a normal position. FIGS. 1 and 2 are exploded views of the image stabilizing unit 2; FIG. 1 shows the image stabilizing unit 2 viewed from an obliquely rear side, and FIG. 2 shows the image stabilizing unit 2 viewed from an obliquely front side.

Reference numeral 31 denotes a base lens barrel as a reference member serving as a positioning reference for a movable lens barrel 32 (described later) in the optical axis direction. The base lens barrel 31 holds the right and left fixed lenses L3R and L3L. The movable lens barrel 32 corresponds to a lens holding member, which is formed of a resin material as one body with right and left lens holding portions holding the right and left movable lenses L4R and L4L and a connecting portion 32J connecting these right and left lens holding portions. The connecting portion 32J has, as described later, flexibility allowing at least bending deformation and torsion deformation. The movable lens barrel 32 is formed as a member movable (shiftable and rotatable) in the plane orthogonal to the optical axes OR and OL integrally with the right and left movable lenses L4R and L4L. However, rotation of the movable lens barrel 32 is limited by a rotation limiting mechanism described later.

Reference numerals 33R and 33L denote supporting balls (hereinafter simply referred to as "balls"); three balls are provided at a surrounding area of each of the right and left movable lenses L4R and L4L. The right three balls 33R constitute a right ball group, and the left three balls 33L constitute a left ball group. The balls 33R and 33L are formed of a stainless steel material such as SUS440C or a ceramic material. The ceramic material is a nonmagnetic material that is not attracted by magnets, which provides no influence on drive and assembling of the image stabilizing unit 2 and which therefore is more suitable for the balls 33R and 33L than SUS440C or the like.

Reference numerals 31aR and 31aL denote ball receiving portions that are formed as concave portions at three places in each of right and left parts of the base lens barrel 31. The balls 33R and 33L are respectively received in the ball receiving portions 31aR and 31aL, and each ball is rollably in contact with a bottom face (planar face) of each ball receiving portion. The ball receiving portion has a function of limiting an area where each ball is rollable.

Reference numerals 32aR and 32aL denote ball contact faces that are formed at three places in each of right and left parts of the movable lens barrel 32. The balls 33R and 33L are respectively in contact with the ball contact faces 32aR and 32aL. The right and left ball groups are thus disposed at the surrounding areas of the movable lenses L4R and L4L between the base lens barrel 31 and the movable lens barrel 32.

Reference numeral 34 denotes a vertical guide (first guiding member). Reference numerals 35b and 35c denote vertical guiding balls as first balls; two vertical guiding balls 35b and two vertical guiding balls 35c are provided. In the movable lens barrel 32, reference numeral 32b denotes guiding grooves provided for the two vertical guiding balls 35b, and reference numeral 32c denotes guiding grooves provided for the two vertical guiding balls 35c. In the vertical guide 34, reference numeral 34b denotes guiding grooves provided for the two vertical guiding balls 35b, and reference numeral 34c denotes guiding grooves provided for the two vertical guiding balls 35c.

The guiding grooves 32b and 34b and the guiding grooves 32c and 34c respectively sandwich the vertical guiding balls 35b and 35c in the optical axis direction to hold these balls 35b and 35c rollably in the vertical direction. The guiding grooves 32b and 34b and the guiding grooves 32c and 34c respectively engage with the vertical guiding balls 35b and 35c in the horizontal direction. Thereby, the movable lens barrel 32 and the vertical guide 34 are guided so as to be relatively movable only in the vertical direction.

The four vertical guiding balls 35b and 35c and the guiding grooves 32b, 34b, 32c and 34c corresponding thereto constitute a vertical guiding mechanism as a first guiding mechanism including at least three first balls.

Reference numeral 36 denotes a horizontal guide (second guiding member). Reference numerals 37d and 37e denote horizontal guiding balls as second balls; two horizontal guiding balls 37d and one horizontal guiding ball 37e are provided. In the horizontal guide 36, reference numeral 36d denotes guiding grooves provided for the two horizontal guiding balls 37d, and reference numeral 36e denotes a guiding groove provided for the one horizontal guiding ball 37e.

The guiding grooves 34d and 36d and the guiding grooves 34e and 36e respectively sandwich the horizontal guiding balls 37d and 37e in the optical axis direction to hold these balls 37d and 37e rollably in the horizontal direction. The guiding grooves 34d and 36d and the guiding grooves 34e and 36e respectively engage with the horizontal guiding balls 37d and 37e in the vertical direction. Thereby, the vertical guide 34 and the horizontal guide 36 are guided so as to be relatively movable only in the horizontal direction.

The three horizontal guiding balls 37d and 37e and the guiding grooves 34d, 36d, 34e and 36e corresponding thereto constitute a horizontal guiding mechanism as a second guiding mechanism including at least three second balls.

Reference numeral 38 denotes a rear base. The rear base 38 has at its upper part a face 38a facing rearward and a face 38b facing frontward. These faces 38a and 38b sandwich faces correspondingly formed in the base lens barrel 31 in the optical axis direction. The rear base 38 is integrated with the base lens barrel 31 with two fixing screws 39.

Reference numerals 36f and 36g denote positioning pins formed on a rear face of the horizontal guide 36. The rear base 38 is formed with a positioning hole portion 38f and a positioning elongate hole portion 38g respectively corresponding to the positioning pins 36f and 36g with dimensions to provide a small gap with the positioning pins 36f and 36g.

The horizontal guide 36 is held movably in the optical axis direction though its movements in the vertical direction, the horizontal direction and a rotational direction are limited (prevented) by a biasing force received from a rotation biasing spring 41 (described later) and acting downward with respect to the rear base 38. The base lens barrel 31, the rear base 38 and the horizontal guide 36 constitute an image stabilizing base member forming a base for limiting the vertical and horizontal shifting of the movable lens barrel 32 and rotation thereof.

Reference numeral 40 denotes frontward biasing springs as first biasing members provided right and left. Each frontward biasing spring 40 is a compression coil spring, which is held by insertion of its ends into circular concave portions 36h and 38h respectively formed in the horizontal guide 36 and the rear base 38.

The frontward biasing springs 40 bias the horizontal guide 36 frontward in the optical axis direction with respect to the fixed rear base 38 with being guided by the positioning pins 36f and 36g, the positioning hole portion 38f and the positioning elongate hole portion 38g. That is, the frontward biasing springs 40 apply a biasing force toward one side (toward the movable lens barrel 32 from the rear base 38) in the optical axis direction to the horizontal guiding mechanism and the vertical guiding mechanism.

Reference numeral 41 denotes the above-mentioned rotation biasing spring as a second biasing member. The rotation biasing spring 41 is a compression coil spring, which is disposed between seating surfaces 36i and 38i formed in the horizontal guide 36 and the rear base 38 and which is held by insertion of cylindrical protrusions formed on the seating surfaces 36i and 38i into ends of the rotation biasing spring 41. The rotation biasing spring 41 biases the horizontal guide 36 downward with respect to the fixed rear base 38.

The downward biasing of the horizontal guide 36 applies a downward biasing force also to the vertical guide 34 that is prevented from being moved in the vertical direction with respect to the horizontal guide 36 by the above-described horizontal guiding mechanism. As a result, vertical movement of the vertical guide 34 with respect to the rear base 38 is limited (prevented). Thus, the rotation biasing spring 41 applies a biasing force toward one side (downward) in the vertical direction to the vertical guide 34 that is the first guiding member.

Figure 6:
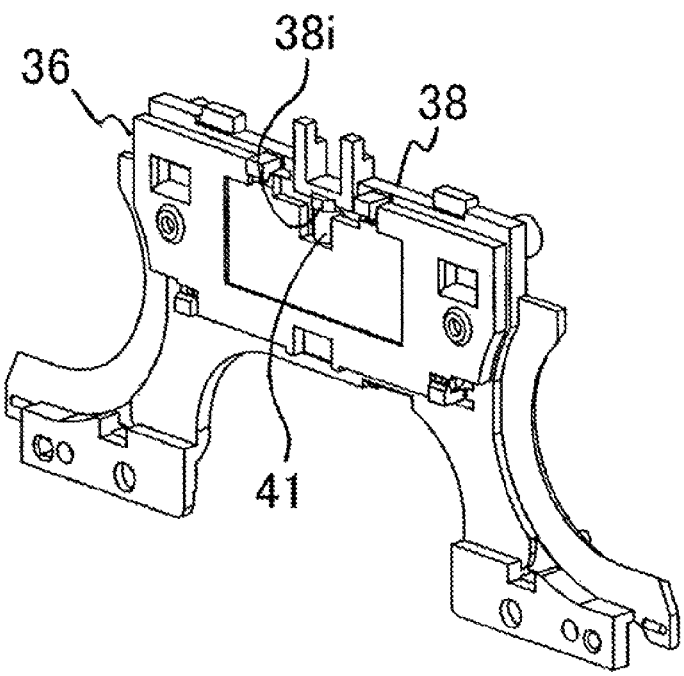
FIG. 6 is a perspective front view of the image stabilizing unit in the embodiment in a state where a horizontal guide and a rear base are assembled.
Figure 7:
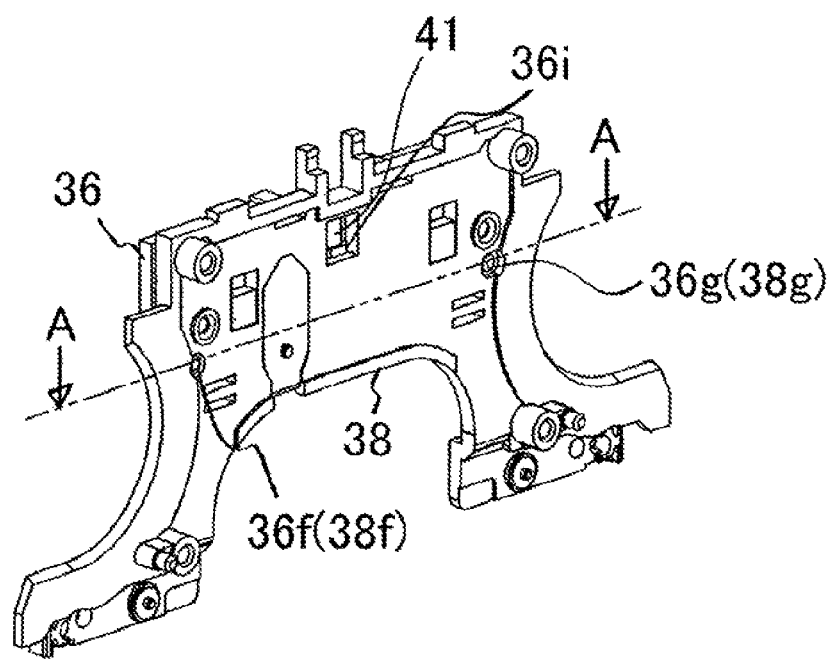
FIG. 7 is a perspective rear view of the image stabilizing unit in the embodiment in the state where the horizontal guide and the rear base are assembled.

Description will be made of a relationship between the horizontal guide 36 and the rear base 38 with reference to FIGS. 6 and 7. FIGS. 6 and 7 are respectively an oblique front view and an oblique rear view of the horizontal guide 36 and the rear base 38 assembled to each other. The frontward biasing springs 40 are disposed between the horizontal guide 36 and the rear base 38, so that they are not shown in FIGS. 6 and 7.

As shown in FIG. 6, in a predetermined assembled state of the horizontal guide 36 and the rear base 38, the seating surfaces 36i and 38i, which are surfaces where the rotation biasing spring 41 is attached, face each other approximately in the vertical direction, and the rotation biasing spring 41 biases the horizontal guide 36 downward.

As shown in FIG. 7, the positioning pins 36f and 36g guiding the horizontal guide 36 in the optical axis direction are pressed against the positioning hole portion 38f and the positioning elongate hole portion 38g in a direction shown by an arrow A by the biasing force of the rotation biasing spring 41. This configuration limits (prevents) positional changes of the horizontal guide 36 in the rotational direction, in other words, rotation of the horizontal guide 36, with respect to the rear base 38.

In FIGS. 1 and 2, reference numeral 42m denotes a part of a flexible substrate to electrically connect electric elements provided in the image stabilizing unit 2 with the electric substrate 4 shown in FIG. 5. The part 42m of the flexible substrate 4 is hereinafter referred to as "a flexible substrate 42m". Reference numeral 42c denotes an insertion portion of the flexible substrate, which is inserted into a connector (not shown) mounted on the electric substrate 4. Reference numeral 43 denotes a retaining plate to fix the flexible substrate 42m.

Reference numeral 44 denotes right and left movable lens barrel biasing springs. Each movable lens barrel biasing spring 44 is a tension coil spring whose ends are hooked to a hooking portion 32d of the movable lens barrel 32 and a hooking portion 31d of the base lens barrel 31, thereby pulling the movable lens barrel 32 frontward with respect to the base lens barrel 31. Specific effects of the movable lens barrel biasing springs 44 will be described later.

Next, description will be made of actuators to shift the movable lens barrel 32 in two directions orthogonal to each other in the plane orthogonal to the optical axis direction and a configuration for detecting positions of the movable lens barrel 32 in the image stabilizing unit 2. Reference numeral 45P denotes right and left driving coils to generate upward and downward driving forces. Reference numeral 45Y denotes right and left driving coils to generate rightward and leftward driving forces. The driving coils 45P and 45Y are bonded to the movable lens barrel 32.

Reference numerals 42R and 42L denote parts of the flexible substrate 4 each connecting to the flexible substrate 42m. The parts 42R and 42L are hereinafter also referred to as "flexible substrates 42R and 42L". The flexible substrate 42R is connected to the right driving coils 45P and 45Y, and the flexible substrate 42L is connected to the left driving coils 45P and 45Y. Each driving coil is supplied with electric power from the electric substrate 4 through the insertion portion 42c of the flexible substrate 42m.

Reference numeral 46 denotes a driving magnet, and reference numeral 47 denotes a driving yoke closing a path of a magnetic flux generated from the driving magnet 46 to form a magnetic circuit. The driving yoke 47 includes a rear yoke portion 47a disposed at the rear of the driving magnet 46 and an opposite yoke 47b forming an air layer with the driving coil 45P to allow generation of the driving force by the driving coil 45P.

The driving magnet 46 and the driving yoke 47 are provided for each of the driving coil 45P and the driving coil 45Y. The driving magnet 46 has, for the driving coil 45P, two upper and lower magnetized areas as shown in FIG. 4. Each of the upper and lower magnetized areas includes an N-pole and an S-pole arranged in a front and rear direction (optical axis direction), and the N-pole and the S-pole in the one magnetized area are arranged oppositely in the front and rear direction to those in the other magnetized area. The driving magnet 46 has, for the driving coil 45Y, two right and left magnetized areas as shown in FIGS. 1 and 2. Each of the right and left magnetized areas includes an N-pole and an S-pole arranged in the front and rear direction, and the N-pole and the S-pole in the one magnetized area are arranged oppositely in the front and rear direction to those in the other magnetized area.

The driving magnet 46 and the driving yoke 47 provided for each of the driving coils 45P and 45Y are held by the base lens barrel 31 by fixing of the driving yoke 47 to the base lens barrel 31 with a fixing screw 48. The driving coils 45P and 45Y, and the driving magnet 46 and the driving yoke 47 that are provided therefor constitute an actuator to shift the movable lens barrel 32 upward and downward (that is, in the vertical direction) and rightward and leftward (that is, in the horizontal direction) in the plane orthogonal to the optical axis direction.

Reference numeral 49P denotes a sensor magnet set to generate vertical position information of the movable lens barrel 32. Reference numeral 49Y denotes a sensor magnet set to generate horizontal position information of the movable lens barrel 32. The sensor magnet sets 49P and 49Y are respectively provided with, at the rear thereof, sensor back yokes 50P and 50Y. Each sensor magnet set are fixed to the movable lens barrel 32 by sandwiching the movable lens barrel 32 from the front and rear with a magnetic attractive force.

The sensor magnet set 49P includes two upper and lower magnets having a same rectangular parallelepiped shape with a wide horizontal width. The two upper and lower magnets are arranged such that their N-poles and S-poles are respectively located at mutually opposite sides in the front and rear direction. At the rear of the two upper and lower magnets, the sensor back yoke 50P closes a magnetic path.

The sensor magnet set 49Y includes two right and left magnets having a same rectangular parallelepiped shape with a wide vertical width. The two right and left magnets are arranged such that their N-poles and S-poles are respectively located at mutually opposite sides in the front and rear direction. At the rear of the two right and left magnets, the sensor back yoke 50Y closes a magnetic path.

Reference numeral 51P denotes a hall element that is disposed so as to face the sensor magnet set 49P and outputs signals according to the vertical shifting of the movable lens barrel 32. Reference numeral 51Y denotes a hall element that is disposed so as to face the sensor magnet set 49Y and outputs signals according to the horizontal shifting of the movable lens barrel 32. Reference numeral 42H denotes a part of the flexible substrate 4, which is connected to the flexible substrate 42m. The part 42H is hereinafter also referred to as "a flexible substrate 42H". The hall elements 51P and 51Y are mounted on the flexible substrate 42H.

Reference numeral 52 denotes a sheet metal to position the hall elements 51P and 51Y. The sheet metal 52 holds the flexible substrate 42H, positions the hall elements 51P and 51Y at its opening portions 52P and 52Y, and is fixed to the base lens barrel 31 with four fixing screws 53. The output signals from the hall elements 51P and 51Y are used to acquire the vertical and horizontal position information of the movable lens barrel 32

Reference numeral 54 denotes right and left self-weight supporting springs as third biasing members. Each of the self-weight supporting springs 54 is a tension coil spring, and both ends thereof are hooked on a hook portion 34f of the vertical guide 34 and a hook portion 32f of the movable lens barrel 32. The vertical guide 34 is movable only in the horizontal direction with respect to the horizontal guide 36. The horizontal guide 36 is movable only in the front and rear direction with respect to the rear base 38. Accordingly, the self-weight supporting springs 54 can pull the movable lens barrel 32 upward (in an opposite direction to a direction of gravitational force) with respect to the vertical guide 34.

The movable lens barrel 32 is provided with the right and left movable lenses L4L and L4R, the driving coils 45P and 45Y, the sensor magnet sets 49P and 49Y, the sensor back yokes 50P and 50Y and others integrally attached thereto. Setting spring forces of the self-weight supporting springs 54 such that the movable lens barrel 32, which has a weight including weights of the right and left movable lenses L4L and L4R, the driving coils 45P and 45Y, the sensor magnet sets 49P and 49Y, the sensor back yokes 50P and 50Y and others, may be located at the vicinity of a vertical center position of a shiftable area of the movable lens barrel 32 when the binoculars is in the normal position enables reduction of electric power supplied to the driving coil 45P in a normal use state. In other words, such spring force setting eliminates need of electric power to lift up the weight of the movable lens barrel 32, which enables reduction of power consumption. Moreover, it enables improvement of responsivity of the movable lens barrel 32 at a higher frequency range. However, the self-weight supporting spring 54 may be omitted.

Figure 8:
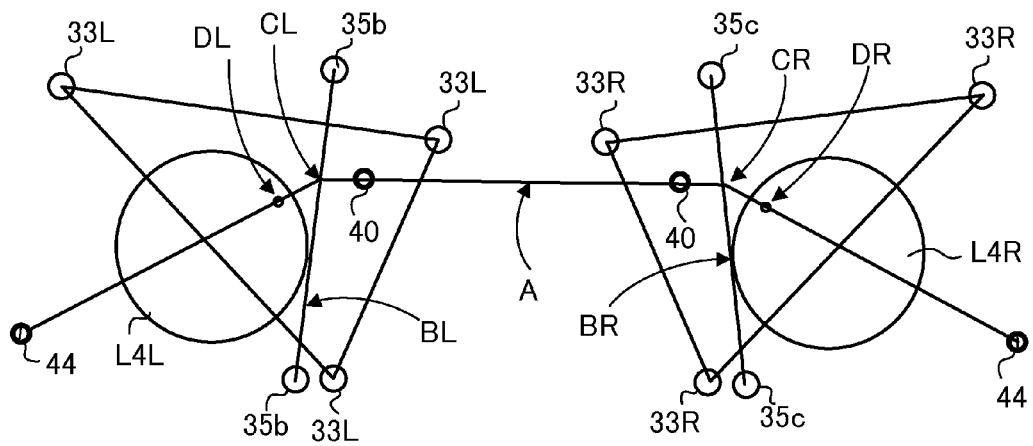
FIG. 8 shows a relationship between balls and biasing forces in the image stabilizing unit in the embodiment.

Next, description will be made of a relationship between the ball groups, the right and left frontward biasing spring 40 and the movable lens barrel biasing springs 44 with reference to FIG. 8. The right and left frontward biasing springs 40 are compressed between the back base 38 and the horizontal guide 36 to generate frontward biasing forces in the optical axis direction. These biasing forces are applied to the vertical guide 34 via the horizontal guide 36 and the horizontal guiding balls 37d and 37e, and are transmitted to the vertical guiding balls 35b and 35c. That is, the movable lens barrel 32 is biased directly by the vertical guiding balls 35b and 35c in the optical axis direction.

A resultant force of the biasing forces generated by the right and left frontward biasing springs 40 acts on a position of an intersection point CL of a line A connecting centers of these frontward biasing springs 40 and a line BL connecting the two vertical guiding balls 35b and on a position of an intersection point CR of the line A and a line BR connecting the two vertical guiding balls 35c.

In addition, the movable lens barrel 32 is pulled frontward by the right and left movable lens barrel biasing springs 44. Resultant forces of the biasing forces generated by the right and left movable lens barrel biasing springs 44 and the biasing forces generated by the right and left frontward biasing springs 40 respectively act on positions of points DL and DR on lines connecting the intersection points CL and CR and centers of the right and left movable lens barrel biasing springs 44.

The point DR is located inside the three balls 33R of the right ball groups and the point DL is located inside the three balls 33L of the left ball group. That is, the points DR and DL are located inside a triangle area where the three balls are vertices. Such a configuration makes it possible to nearly equalize pressing forces acting on the three balls. Furthermore, bringing each of the points DL and DR closer to a centroid of the triangle makes it possible to more nearly equalize the pressing forces acting on the three balls.

As described above, this embodiment configures right and left biasing members with the right and left frontward biasing springs 40 and the right and left movable lens barrel biasing springs 44. However, the right and left movable lens barrel biasing springs 44 are provided for making the acting positions of the right and left biasing forces more proper, so that they may be not necessarily provided.

The movable lens barrel 32 has, as described above, a shape in which the lens holding members holding right and left movable lenses L4R and L4L are connected by the connecting portion 32J.

It is comparatively easy to approximately equalize heights in the optical axis direction of the three ball contact faces 32aL formed in the surrounding area of the movable lens L4L in the movable lens barrel 32 with a required mechanical accuracy. It is not necessary to perfectly equalize the heights of the three ball contact surfaces 32aL, and it is only necessary that differences of the heights fall within a range where a lens distance between the movable lens L4L and the fixed lens L3L facing thereto and a relative tilting of the movable lens L4L with respect to the fixed lens L3L are optically allowed. On the contrary, it is difficult to perfectly equalize the heights of the three ball contact faces 32aL. The same applies to the three ball contact faces 32aR formed in the surrounding area of the movable lens L4R in the movable lens barrel 32.

Moreover, it is also difficult to perfectly equalize heights in the optical axis direction of the bottom faces of the three ball receiving portions 31aL formed in the surrounding area of the fixed lens L3L in the base lens barrel 31. The same applies to the three ball receiving portions 31aR formed in the surrounding area of the fixed lens L3R in the base lens barrel 31.

Thus, it is extremely difficult to make the six balls 33R and 33L in contact with the ball contact faces 32aR and 32aL and the bottom faces of the ball receiving portions 31aR and 31aL, which are ball receiving faces, even though the movable lens barrel 32 is assembled to the base lens barrel 31 at a predetermined position. If the movable lens barrel 32 is a wholly highly rigid member that never deforms, application of the biasing forces of the frontward biasing springs 40 and the movable lens barrel biasing springs 44 to the movable lens barrel 32 only makes three of the six balls in contact with the ball contact faces 32aR or 32aL and the bottom faces of the ball receiving portions 31aR or 31aL.

Such a state may generate displacement of the movable lens barrel 32 in the optical axis direction, which varies the distance between the movable lenses L4R and L4L and the fixed lenses L3R and L3L or tilts the movable lenses L4R and L4L with respect to the optical axes of the right and left optical systems.

Therefore, this embodiment provides, to the connecting portion 32J of the movable lens barrel 32, flexibility that allows at least bending deformation and torsion deformation by the biasing forces of the frontward biasing springs 40 and the movable lens barrel biasing springs 44. The deformation of the connecting portion 32J by the above biasing forces makes it possible to make all of the right three balls 33R and the left three balls 33L in contact with the ball contact faces 32aR and 32aL formed in the movable lens barrel 32 and the bottom faces of the ball receiving portions 31aR and 31aL formed in the base lens barrel 31. As a result, it is possible to maintain a constant distance between the movable lenses L4R and L4L and the fixed lenses L3R and L3L, and to prevent tilting of the movable lenses L4R and L4L with respect to the optical axes of the right and left optical systems.

Figure 9:
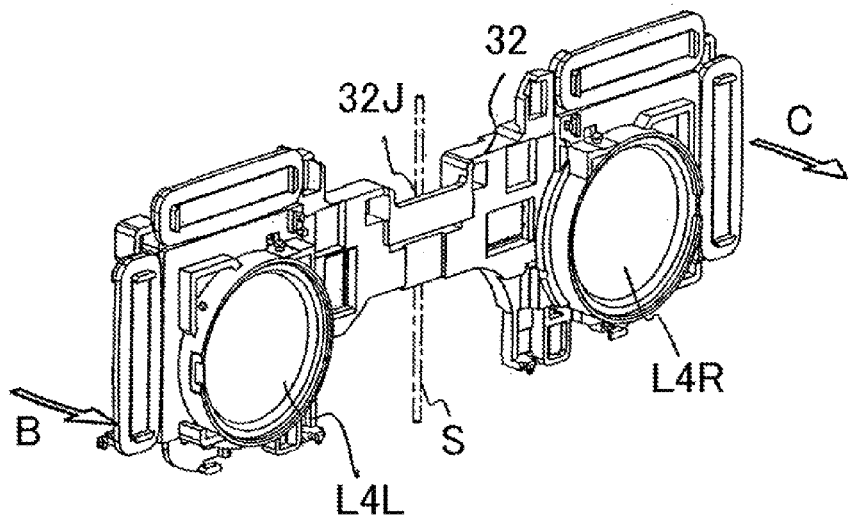
FIG. 9 is a perspective view showing bending deformation of a connecting portion of a movable lens barrel in the image stabilizing unit in the embodiment.
Figure 10:
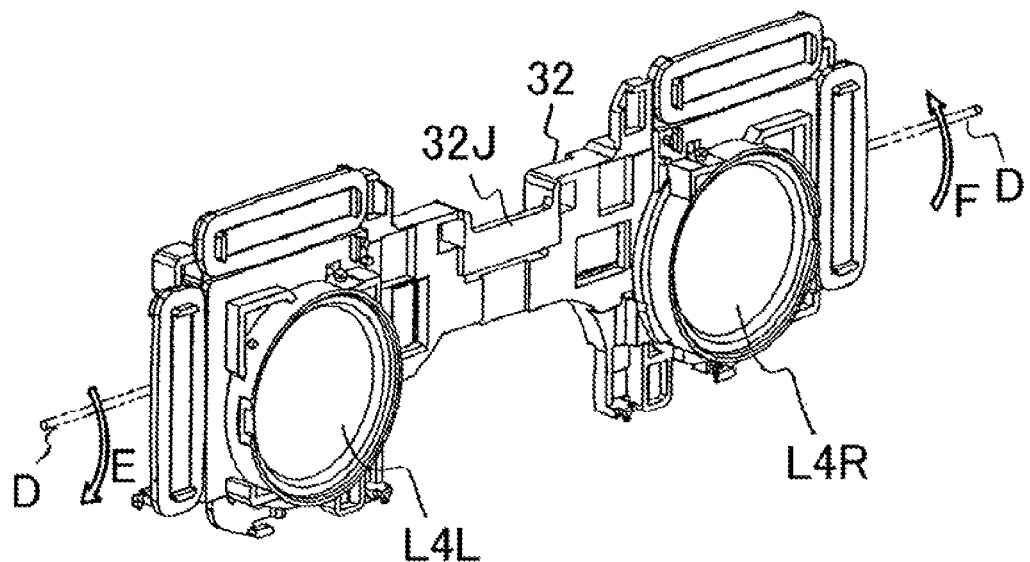
FIG. 10 is a perspective view showing torsion deformation of the connecting portion.

FIGS. 9 and 10 show the flexibility of the connecting portion 32J of the movable lens barrel 32. FIG. 9 shows bending deformation of the connecting portion 32J. FIG. 10 shows torsion deformation of the connecting portion 32J.

In FIG. 9, reference character S denotes a central axis of displacement (bending) of the right and left movable lenses L4R and L4L in directions of arrows B and C caused by the bending deformation of the connecting portion 32J. In FIG. 10, reference character D denotes a central axis of displacement (torsion) of the right and left movable lenses L4R and L4L in directions of arrows E and F caused by the torsion deformation of the connecting portion 32J. Actually, generation of a combination of the bending deformation and the torsion deformation makes it possible to make all of the right three balls 33R and the left three balls 33L in contact with the ball contact faces 32aR and 32aL formed in the movable lens barrel 32 and the bottom faces of the ball receiving portions 31aR and 31aL formed in the base lens barrel 31.

Figures 11A, 11B:
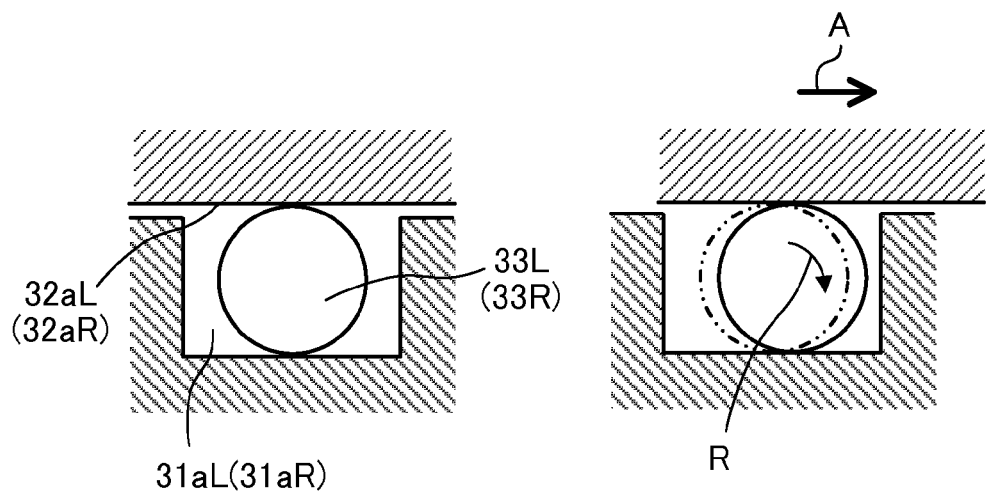
FIGS. 11A and 11B show a relationship between the balls, a base lens barrel and the movable lens barrel in the image stabilizing unit in the embodiment.

FIGS. 11A and 11B show a relationship among the ball 33L (33R), the base lens barrel 31 and the movable lens barrel 32. In FIGS. 11A and 11B, the ball 33L (33R) is in contact with the bottom face of the ball receiving portion 31aL (31aR) formed in the base lens barrel 31 and the ball contact face 32aL (32aR) formed in the movable lens barrel 32 by the above-mentioned biasing force.

FIG. 11A shows a state where the ball 33L (33R) is located at an approximate center of its rollable area limited by walls formed in the ball receiving portion 31aL (31aR) and where the movable lens barrel 32 is also located at a center of its shiftable area. FIG. 11B show a state where the movable lens barrel 32 is shifted in a direction of an arrow A from the position shown in FIG. 11A. During the shifting of the movable lens barrel 32, the ball 33L (33R) being in contact with the bottom face of the ball receiving portion 31aL (31aR) and the ball contact face 32aL (32aR) rolls in a direction of an arrow R without sliding. A dashed-two dotted circle in FIG. 11B shows the position of the ball 33L (33R) shown in FIG. 11A. Thus, during the shifting of the movable lens barrel 32, no sliding friction is generated, but rolling friction is generated. The rolling friction is significantly smaller than the sliding friction, which enables reduction of driving resistance of the movable lens barrel 32. This is advantageous for minute drive of the movable lens barrel 32 by the actuators.

Figure 12A:
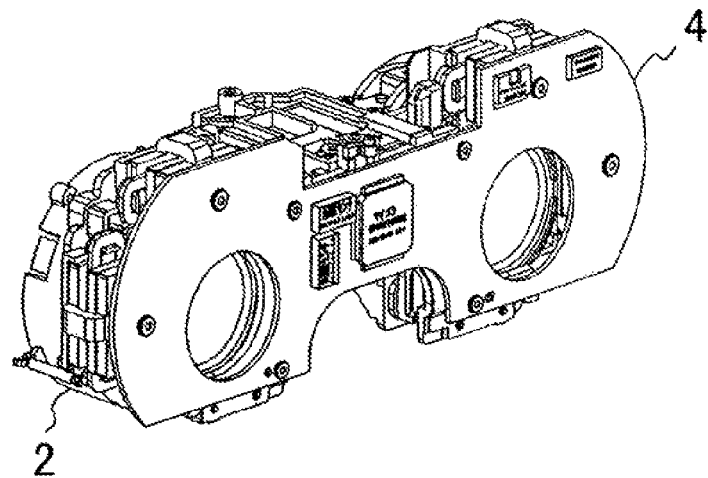
FIGS. 12A and 12B are perspective views of the image stabilizing unit and an electrical substrate in the embodiment.
Figure 12B:
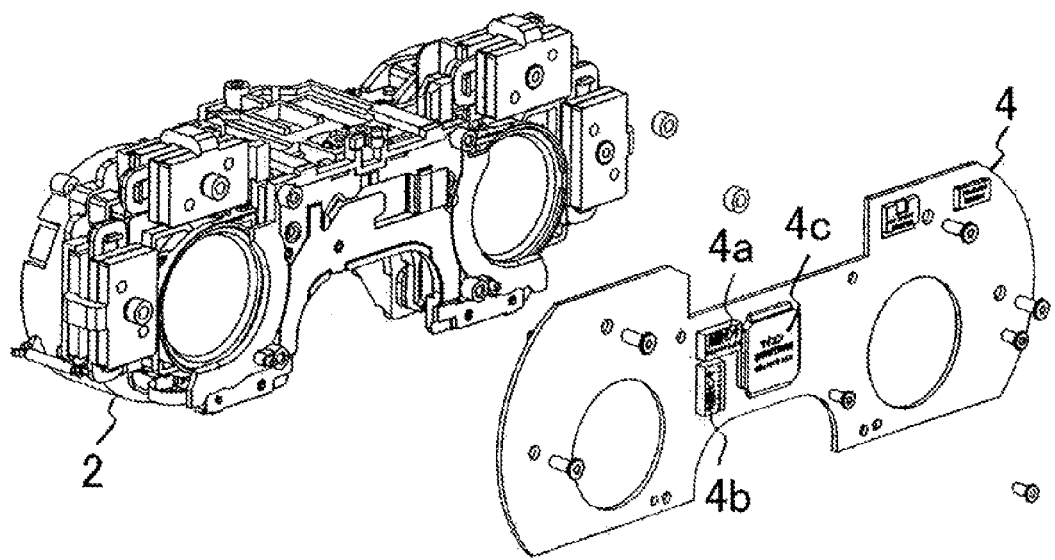

As shown in FIGS. 12A and 12B, the electric substrate 4 that controls the drive of the image stabilizing unit 2 is integrally attached to the image stabilizing unit 2 with screws. Shake sensors 4a and 4b such as vibration gyros that detect a vertical angular velocity and a horizontal angular velocity of the binoculars are mounted on the electric substrate 4. Reference numeral 4c denotes a microcomputer that controls energization of the driving coils 45P and 45Y on the basis of information on the angular velocities from the shake sensors 4a and 4b to vertically and horizontally shift the movable lens barrel 32 in order to correct (reduce) the image blur.

Next, description will be made of a configuration to rotation limitation (rotation prevention) for the movable lens barrel 32 in the plane orthogonal to the optical axis direction. As described above, the movable lens barrel 32 and the vertical guide 34 are allowed to relatively move only in the vertical direction by the configuration in which the vertical guiding balls 35b and 35c are sandwiched by the respectively corresponding guiding grooves 32b, 34b and 32c, 34c. Moreover, the vertical guide 34 and the horizontal guide 36 are allowed to relatively move only in the horizontal direction by the configuration in which the horizontal guiding balls 37d and 37e are sandwiched by the respectively corresponding guiding grooves 34d, 36d and 34e and 36e. In addition, rotational position change of the horizontal guide 36 is limited by the positioning hole portion 38f and the positioning elongated hole portion 38g that are formed in the rear base 38 integrally attached to the base lens barrel 31, the positioning pins 36f and 36g formed in the horizontal guide 36 and the rotation biasing spring 41. Such a configuration enables the movable lens barrel 32 to vertically and horizontally shift without rotating in the plane orthogonal to the optical axis direction.

Figure 13A:
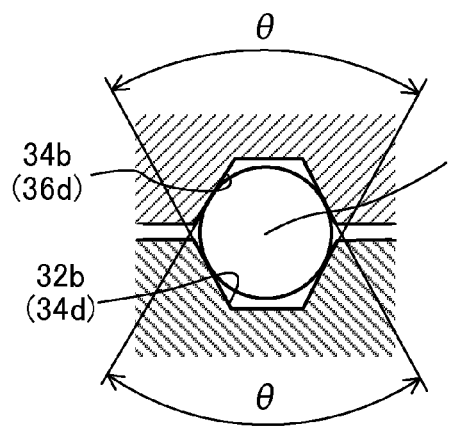
FIGS. 13A, 13B, 13C and 14 show relationships between a guiding ball and a guiding groove in the image stabilizing unit in the embodiment.

Description will be made of a relationship between each guiding ball and each guiding groove with reference to FIGS. 13A, 13B, 13C and 14A. FIG. 13A shows a cross section of the vertical guiding ball 35b and the guiding grooves 32b and 34b that constitute the vertical guiding mechanism. A direction perpendicular to the paper of FIG. 13A corresponds to the vertical direction that is a guiding direction of the relative movement of the vertical guiding ball 35b and the guiding grooves 32b and 34b. Reference numerals in parentheses in the figures show the horizontal guiding ball 37d and the guiding grooves 34d and 36d that constitute the horizontal guiding mechanism which guides the horizontal relative movement. The configuration of the horizontal guiding mechanism is same as that of the vertical guiding mechanism, so that description will herein be made of the vertical guiding mechanism.

The guide grooves 32b and 34b have right and left slopes forming an open angle θ and a same shape in the cross section orthogonal to the guiding direction (that is, on the paper of the figure). The vertical guiding ball 35b is sandwiched between the guiding grooves 32b and 34b by the biasing force of the frontward biasing spring 40, which limits movements of the guiding grooves 32b and 34b (that is, the movable lens barrel 32 and the vertical guide 34) in a direction orthogonal to the guiding direction.

Figure 13B:
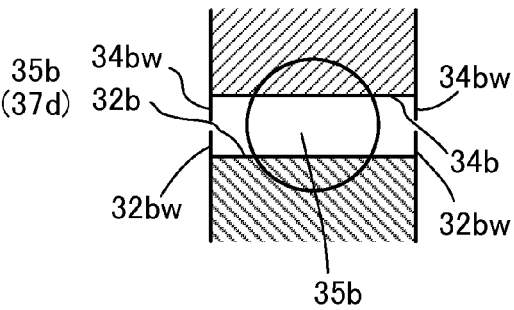
Figure 13C:
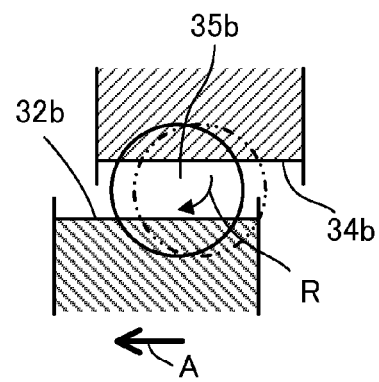

FIGS. 13B and 13C show movements of the vertical guiding ball 35b and the guiding grooves 32b and 34b during the shifting of the movable lens barrel 32. Straight lines shown by 32b and 34b in these figures show contact lines of the slopes of the guiding grooves 32b and 34b shown in the FIG. 13A with the vertical guiding ball 35b. The guiding grooves 32b and 34b respectively have, at their both ends in the guiding direction, roll limiting portions 32bw and 34bw each limiting a rollable area of the vertical guiding ball 35b.

FIG. 13B shows a state where the vertical guiding ball 35b is located at an approximate center of the rollable area in the guiding grooves 32b and 34b and where the movable lens barrel 32 is also located at the center of its shiftable area. Moreover, FIG. 13C shows a state where the movable lens barrel 32 is shifted in the direction of the arrow A from the position shown in FIG. 13B. During the shifting of the movable lens barrel 32, the vertical guiding ball 35b is in contact with the slopes of the guide grooves 32b and 34b and rolls by friction generated with the slopes in the direction of the arrow R without sliding with respect to the slopes. A dashed-two dotted circle in FIG. 13C shows the position of the ball 35b shown in FIG. 13B.

This embodiment vertically separately arranges two vertical guiding mechanisms each constituted by such a combination of the vertical guiding ball 35b and the guiding grooves 32b and 34b. This configuration allows the relative movement of the movable lens barrel 32 and the vertical guide 34 only in the vertical direction without displacement thereof in other directions. This embodiment horizontally separately arranges two horizontal guiding mechanisms each constituted by, similarly to the vertical guiding mechanism, a combination of the horizontal guiding ball 37d and the guiding grooves 34d and 36d. This configuration allows the relative movement of the vertical guide 34 and the horizontal guide 36 only in the horizontal direction without displacement thereof in other direction.

Figure 14:
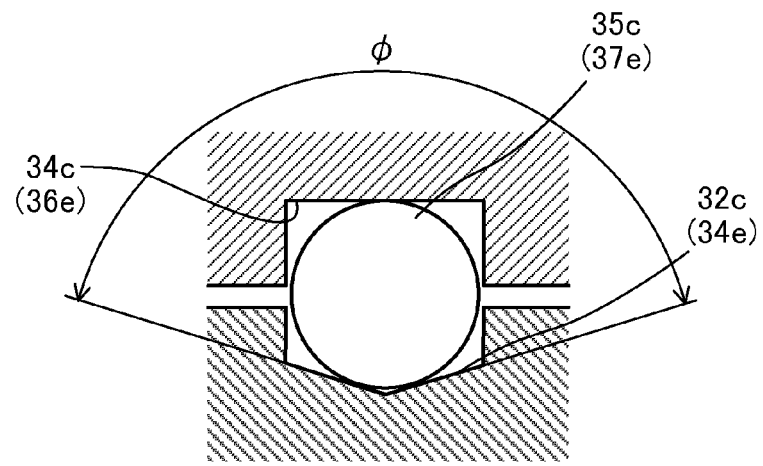

FIG. 14 shows a cross section of the vertical guiding ball 35c and the guiding grooves 32c and 34c constituting a vertical supporting mechanism that supports the vertical relative movement in the vertical guiding mechanism. A direction perpendicular to the paper of FIG. 14 corresponds to the vertical direction that is a relative movement direction. Reference numerals in parentheses in the figure show the horizontal guiding ball 37e and the guiding grooves 34e and 36e that constitute the horizontal supporting mechanism which supports the horizontal relative movement in the horizontal guiding mechanism. The configuration of the horizontal supporting mechanism is same as that of the vertical supporting mechanism, so that description will herein be made of the vertical supporting mechanism.

The guiding groove 32c has right and left bottom portions formed as slopes forming a large open angle φ(>θ). On the other hand, the guiding groove 34c has a bottom portion formed as a plane parallel to the horizontal direction. The vertical guiding ball 35c is sandwiched between the slope bottom portions of the guiding groove 32c and the plane bottom portion of the guiding groove 34c by the biasing force of frontward biasing spring 40, which supports the vertical guide 34 on the movable lens barrel 32. The movements of the vertical guiding ball 35c and the guiding grooves 32c and 34c during the shifting of the movable lens barrel are similar to those of the vertical guiding ball 35b and the guiding grooves 32b and 34b shown in FIGS. 13B and 13C.

The relative movement of the movable lens barrel 32 and the vertical guide 34 in the vertical direction is guided by the two guiding mechanisms each constituted by the vertical guiding ball 35b and the guiding grooves 32b and 34b, without displacement thereof in the other directions. Thus, the bottom portion of the guiding groove 34c is formed as a plane so as to avoid that the supporting mechanism constituted by the vertical guiding ball 35c and the guiding grooves 32c and 34c may provide an excessive limitation to the horizontal relative movement of the movable lens barrel 32 and the vertical guide 34. Moreover, the slopes provided to the bottom portion of the guiding groove 32c with the large open angle φ avoid unnecessary contact of the vertical guiding ball 35c to sidewalls of the guiding groove 32c.

This embodiment also vertically separately arranges two supporting mechanisms each constituted by the vertical guiding ball 35c and the guiding grooves 32c and 34c.

In the above-described movement caused by each guiding ball and each guiding groove to prevent the rotation of the movable lens barrel 32, the guiding ball always rolls without sliding, which is advantageous for the minute drive of the movable lens barrel 32.

As described above, the vertical and horizontal guiding mechanisms in this embodiment can prevent the movable lenses L4R and L4L, which are held by the movable lens barrel 32 and should be vertically and horizontally shifted (moved), from being rotated in the plane orthogonal to the optical axis direction. In addition, the vertical and horizontal guiding mechanisms utilize the rolling of the balls, which can reduce the driving resistance applied to the movable lens barrel 32.

In addition, this embodiment arranges the vertical guiding mechanism (first guiding mechanism) and the horizontal guiding mechanism (second guiding mechanism) further inside than the right and left movable lenses (image stabilizing lenses) L4R and L4L, in other words, between the right and left image stabilizing lenses. This arrangement enables effective use of an internal space of the binoculars, which makes it possible to achieve miniaturization of the binoculars.

Although this embodiment vertically arranges the two supporting mechanisms each constituted by the vertical guiding ball 35c and the guiding grooves 32c and 34c, the two supporting mechanisms are not necessarily needed to be provided. For example, only one supporting mechanism may be provided at the position of the intersection point CR shown in FIG. 9.

Moreover, although this embodiment has described the configuration using the frontward biasing spring 40 as the first biasing member and the rotation biasing spring 41 as the second biasing member, other configuration may be employed. For example, a configuration may be employed which disposes the frontward biasing spring 40 with a tilt with respect to the optical axis direction to use a frontward component force and a downward component force of the biasing force generated by the frontward biasing spring 40 as a force applied by the first biasing member and a force applied by the second biasing member, respectively. That is, the frontward biasing spring 40 may be used as the first and second biasing members.

Moreover, this embodiment has described the case where the ball is located at an approximate center of its rollable area as shown in FIGS. 12A and 13B in a state where the movable member to be moved with being guided by the ball is located at its initial position (neutral position). In this case, the roll limiting portions that limit the rolling of the ball at the ends of the rollable area are provided at positions where the ball is not brought in contact with the roll limiting portions even when the movable member is moved over its entire movable area.

However, in an actual assembled state, any one of the balls may be initially located at a position widely shifted from the approximate center of its rollable area. In this case, moving the movable member once over the entire movable area brings the ball in contact with the roll limiting portions to cause the ball to slide with respect to the movable member in that movement, and returning the movable member to the initial position causes the ball to be located at the approximate center of the rollable area.

Applying a lubricant having an adequate viscosity to the ball and the faces making in contact with the ball enables suppression of increase of resistance when the ball that cannot roll slides with respect to the faces, and enables prevention of easy displacement of the ball due to vibrations applied to the binoculars.

In addition, although this embodiment has described the case where the first and second directions that are rolling directions of the horizontal and vertical guiding balls are orthogonal to each other, the first and second directions are not necessarily needed to be orthogonal to each other, and may be directions forming an angle of, for example, 45 degrees. The same applies to the two directions that are shifting directions of the movable lens barrel by the actuator. Furthermore, although this embodiment has described the case where the rolling directions of the horizontal and vertical guiding balls are identical to the shifting directions of the of the movable lens barrel by the actuator, these directions may be mutually different.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-020171, filed on Feb. 1, 2011, which is hereby incorporated by reference herein in its entirety.

What is claimed is:
1. Binoculars comprising:
right and left optical systems respectively including right and left image stabilizing lenses;
a lens holding member holding both the right and left image stabilizing lenses and being integrally movable in a plane orthogonal to an optical axis direction of the right and left optical systems;
an image stabilizing base member;
an actuator moving the lens holding member with respect to the image stabilizing base member in the plane orthogonal to the optical axis direction;
a first guiding member disposed between the lens holding member and the image stabilizing base member;
a second guiding member disposed between the first guiding member and the image stabilizing base member, the second guiding member engaging with the image stabi- lizing base member and movable with respect to the image stabilizing base member in the optical axis direction;

a first ball disposed between the lens holding member and the first guiding member, rolling of the first ball in a first direction orthogonal to the optical axis direction guiding relative movement of the lens holding member and the first guiding member in the first direction; and a second ball disposed between the first guiding member and the second guiding member, rolling of the second ball in a second direction orthogonal to the optical axis direction and different from the first direction guiding relative movement of the first guiding member and the image stabilizing base member in the second direction;

a first biasing member applying a first biasing force toward the optical axis direction to the first and second guiding members; and a second biasing member applying a second biasing force toward a direction orthogonal to the optical axis direction to the second guiding member, wherein the lens holding member, the first ball, the first guiding member, the second ball, the second guiding member, and the image stabilizing base member are arranged in the optical axis direction.

2. The binoculars according to claim 1, wherein the first and second balls are disposed further inside than the right and left image stabilizing lenses.

* * * * *